United States Patent [19]

Mueller

[11] Patent Number: 4,965,776
[45] Date of Patent: Oct. 23, 1990

[54] PLANAR END-FIRE ARRAY
[75] Inventor: William J. Mueller, Portsmouth, R.I.
[73] Assignee: The United States of America as represented by the Secretary of the Navy, Washington, D.C.
[21] Appl. No.: 795,770
[22] Filed: Jan. 22, 1969
[51] Int. Cl.⁵ ............................................. G01J 15/00
[52] U.S. Cl. ................................... 367/126; 367/123; 367/129
[58] Field of Search ............... 340/9, 6; 343/893, 824; 367/126, 123, 129

[56] References Cited
U.S. PATENT DOCUMENTS 3,028,591 4/1962 Mattingly ..................... 343/893 X
3,368,190 2/1968 Wilson et al. ....................... 367/126
3,378,814 4/1968 Butler ................................. 367/157
3,435,409 3/1969 Bringman et al. .................. 367/126

Primary Examiner—Thomas H. Tarcza
Assistant Examiner—Daniel T. Pihulic
Attorney, Agent, or Firm—Michael J. McGowan; Prithvi C. Lall

[57] ABSTRACT

A planar end-fire acoustic transducer array is composed of a planar matrix of individual elements. In order to give this array an end-fire characteristic, predetermined elements are provided with outputs which are phase-inverted with respect to the outputs of the other elements of the array, the sum of the gains of these predetermined elements being made equal to the sum of the gains of the other elements.

17 Claims, 3 Drawing Sheets

PLANAR END-FIRE ARRAY

The invention described herein may be manufactured and used by or for the Government of the United States of America for governmental purposes without the payment of any royalties thereon or therefor.

This invention relates to a planar transducer array for use in passive sonar systems and, more particularly, to a planar array having elements of varying sensitivity and polarity arranged to give the array an end-fire directional characteristic which has a null at zero bearing and maxima at ±90°.

This directional characteristic is given to the array by shading the individual elements in the array. Shading is accomplished in the subject invention by providing each element with a predetermined polarity and gain. In order to achieve an end-fire characteristic, the sum of the gains of polarity-reversed elements in the array is equal to the sum of the gains of the nonreversed elements.

A sonar transducer having the above directional characteristic has a particular application in the field of antisubmarine warfare (ASW). In the case of torpedo homing systems, countermeasures are frequently deployed to decoy the torpedo away from the actual target. These countermeasure signals must be detected and canceled from the torpedo homing system to insure that the torpedo will respond only to signals coming from the target vehicle. A transducer array which provides a null response directly ahead of the transducer and a maximum response at various angles either side of this direction is capable of producing a signal responsive only to off-axis countermeasures. This signal can be subtracted from the signal produced by the target thus leaving only the signal from the target in the torpedo guidance system. Prior art devices producing the above desired directional characteristic have employed transducers either in a linear configuration or in a cylindrical array. The present invention overcomes the space limitations of such transducer arrays by providing a planar end-fire array capable of being mounted in a relatively compact housing.

The desired directional characteristic is obtained by effectively changing the sensitivities and polarities of the individual transducer elements in such a manner that signals arriving at the array coming from a direction directly ahead of the array will be canceled and signals arriving at the array from any other direction will be sensed and amplified in accordance with the phase relationship of this signal at the various elements. Since it is only the sensitivity and polarity of the various elements in an array which provide the desired pattern, standard planar transducer arrays may be easily adapted for this purpose. In the subject invention, an end-fire acoustic transducer array is composed of a 3×3 planar matrix of individual elements whose outer elements have outputs which are phase-inverted with respect to the output of the center element of the array. The gain of this center element is made equal to the sum of the gains of the outer elements so as to give the array an end-fire characteristic. A 5×5 planar matrix having an end-fire characteristic is also disclosed along with the particular shading and location of its elements.

In order to obtain an end-fire characteristic in either of these arrays, the sum of the gains of the polarity-reversed elements must equal the sum of the gains of the nonreversed elements.

It is therefore an object of this invention to provide a compact planar transducer array having a directional characteristic whereby signals coming from a point directly ahead of the array are nulled while signals coming from any other direction are detected.

It is a further object of this invention to provide an array of elements such that all elements lie in a single plane and are provided with different gains such that the sum of the outputs of the elements in the array provide the array with an end-fire directional characteristic.

It is another object of this invention to provide a planar array of elements such that predetermined elements have outputs which are phase-reversed with respect to the other elements in the array and such that the sum of the gains of the reversed elements equal the sum of the gains of the nonreversed elements.

Other objects, advantages and novel features of the invention will become apparent from the following detailed description thereof when considered in conjunction with the accompanying drawings in which like numerals represent like parts throughout and wherein.

Figures 1, 2A, 2B, 2C, 5:
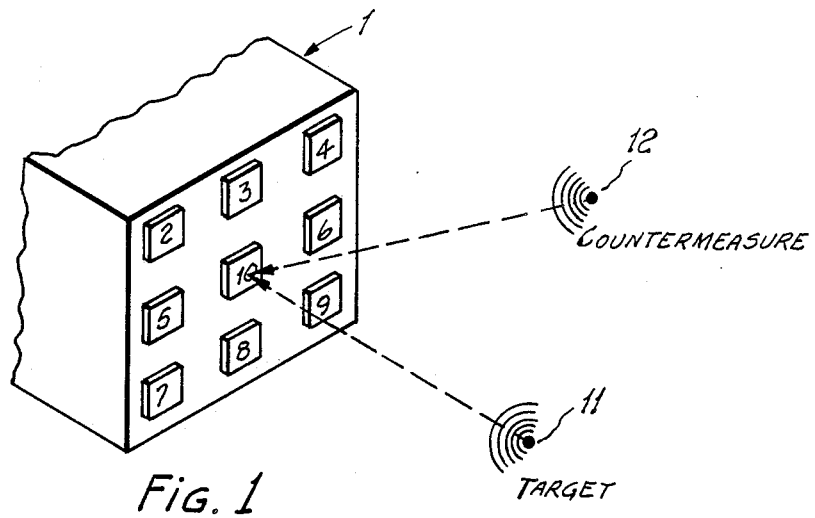
FIG. 1 shows a planar transducer head with a 3×3 element rectilinear array of elements.
FIGS. 2a, 2b and 2c are three diagrams showing transducer element configurations and their relative sensitivities and polarities with respect to each other.
FIG. 5 is a diagram showing the arrangement of elements in a 5×5 element planar array.

Referring to FIG. 1, a sonar transducer 1 is shown housing transducer elements 2 through 10 These elements may be of any type commonly used in sonar transducers such as piezoelectric, magnetostrictive or electromechanical devices In the case of magnetostrictive devices, the outputs can be varied by the number of turns in the pickup coils. The polarities or phase of the outputs can be controlled by the direction in which these coils are wound. Thus the sensitivity and phase of each element can be designed into the physical structure making up the element The design problem for piezoelectric elements is considerably more complicated The polarity of each element depends on the way its output is connected and summed.

In the configuration shown in FIG. 1, all elements are located in a single plane. A target indicated at 11 is shown to be in a direction directly ahead of transducer element 10. A line from the target to the center of transducer 10 is therefore perpendicular to the plane of the elements. Passive signals generated by the target arrive at the face of the transducer as a plane wave. When the target is directly ahead of the array and a weight or sensitivity is assigned to each of elements 2 through 9, the sum of the outputs of these elements when subtracted from the output of element 10 will be zero, assuming element 10 is eight times as sensitive to the incoming acoustic radiation as elements 2 through 9. The null result will occur primarily because the plane wave arrives at all of the transducer elements simultaneously. With the target directly ahead of the array, the outputs of elements 2 through 10 will be in-phase The output of element 10 is shifted 180° and, thereafter, added to the combined output of elements 2 through 9 to achieve the null result A countermeasure signal 12 deployed at any other angle will also arrive as a plane wave at the face of the transducer It will, however, arrive sooner at elements closer to the countermeasure disturbance than at those further away. This will produce a phase difference between the outputs of elements 2 through 9 with the 180° shifted output of element 10 will no result in perfect cancellation. This transducer element configuration will thus have an end-fire directional characteristic.

Figure 4:
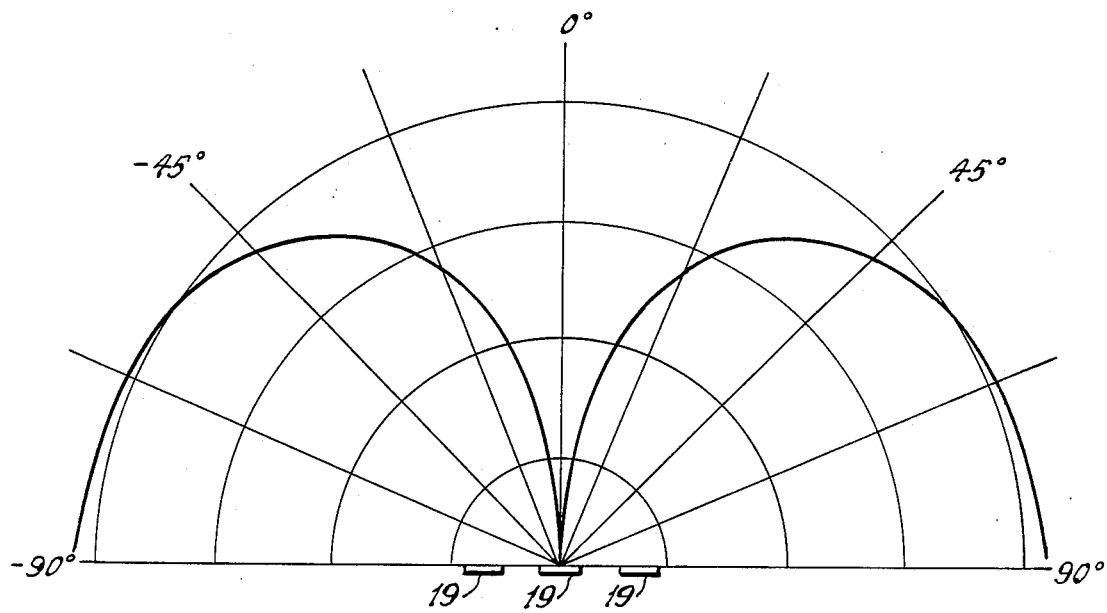
FIG. 4 is a polar plot showing the directivity pattern associated with the transducer elements in FIG. 2c.

FIG. 2a shows an arrangement of transducer elements similar to those shown in FIG. 1. The relative sensitivities are noted by the numbers contained at each of the boxes. These boxes represent individual transducer elements. It will be appreciated that if the signal to be detected is in a horizontal plane only, the configuration of elements shown in FIG. 2c is all that is necessary to produce the desired nulling effect. In the configuration shown in either 2a or 2b, the horizontal and vertical directivity will be the same when normalized to the same maximum sensitivity. The pattern developed by these arrays in one plane is shown in FIG. 4 for the region from −90° to +90° bearing Elements 19 are shown to lie in a horizontal plane along the −90°, +90° axis. These elements, corresponding in weight and polarity to those of FIG. 2c, yield the directivity or sensitivity pattern shown.

In computing a directivity pattern for the horizontal plane, all elements in a vertical column can be summed and treated as one element since the phase of the incoming signal is constant on a vertical line. In this case, the arrays shown in FIGS. 2a and 2b reduce to the equivalent of the array in FIG. 2c. The phase, $\theta_e$, of the electrical output voltages of the outer elements, referenced to the center element, is related to element spacing, d, and target bearing, $\theta_m$, by the following equation:

$$\theta_e = 180 + 360 \, d/\lambda \sin \theta_m \quad (2)$$
$$= 180 \, (1 \pm \sin \theta_m) \text{ for } d = \pm \lambda/2$$

The 180 degrees is added to the right side equation since the outer elements are negative or electrically reversed. The spacing, d, may be plus or minus depending on whether the right or left element is being considered.

With a target dead ahead, the $\sin \theta_m$ terms in the above equations are zero and the signals from the outer elements cancel that from the center element. When the target moves out in bearing, the sine terms contribute to $\theta_e$. With a target at 90 degrees bearing, the signals generated will be in-phase and will add directly.

It will be appreciated that if the outer elements of the planar end-fire array had not been reversed, the output voltages would have added in phase with a target dead ahead and would have canceled with the target moved to 90 degrees. The peak in sensitivity, normally occurring at zero bearing in conventional transducer arrays, is split and moved to the 90 degree positions by the subject array. The patterns produced by the arrays in FIGS. 2a, b and c are called planar end-fire patterns and will be referred to by the letters PEF.

The PEF patterns for the 45° plane are similar to those of the horizontal or vertical planes When the countermeasure signal is detected in a 45 degree angle with respect to the plane of the sensors, the transducer array shown in FIG. 2b is more sensitive since none of the outer elements are on the phase reference line with the center element The elements, therefore, do not remain in-phase opposition to the center element Sensitivity is not much greater, however, because element spacing becomes less than a half wavelength and signals do not reach the in-phase condition at any one bearing. The transducer array shown diagrammatically in FIG. 2a is lower in sensitivity because some outer elements are on the phase reference line and because signals do not reach the in-phase condition on any given bearing.

PEF patterns with minor lobes can be generated by reducing the sensitivity of the center element. In this case total cancellation will not occur with a target dead ahead because the sum of the signals from the outer elements exceeds the signal from the center element. Moreover, there will be some angle usually within ±20 degrees of zero degrees at which the combined sensitivities of the outer elements will match that of the central element. There will thus be a null at the bearing angles at which this occurs. One effect of providing a minor lobe is that the dip in sensitivity becomes wider. This provides a wider notch in which the transducer response is substantially null, thus allowing some latitude for the movement of the target off the zero degree heading. This larger notch can also be achieved by using a larger transducer with more elements.

PEF beam characteristics can also be varied by changing the spacing between elements. If element spacing is less than half a wavelength, the shape of the directivity pattern will not change significantly. The dip will remain at zero and the maximum at 90 degrees. The maximum sensitivity will not be as great as with the half wavelength element spacing since the signals will never reach the in-phase condition where they add directly. If element spacing is greater than one-half wavelength, the maximum in sensitivity will be at a bearing less than 90 degrees.

Figure 3:
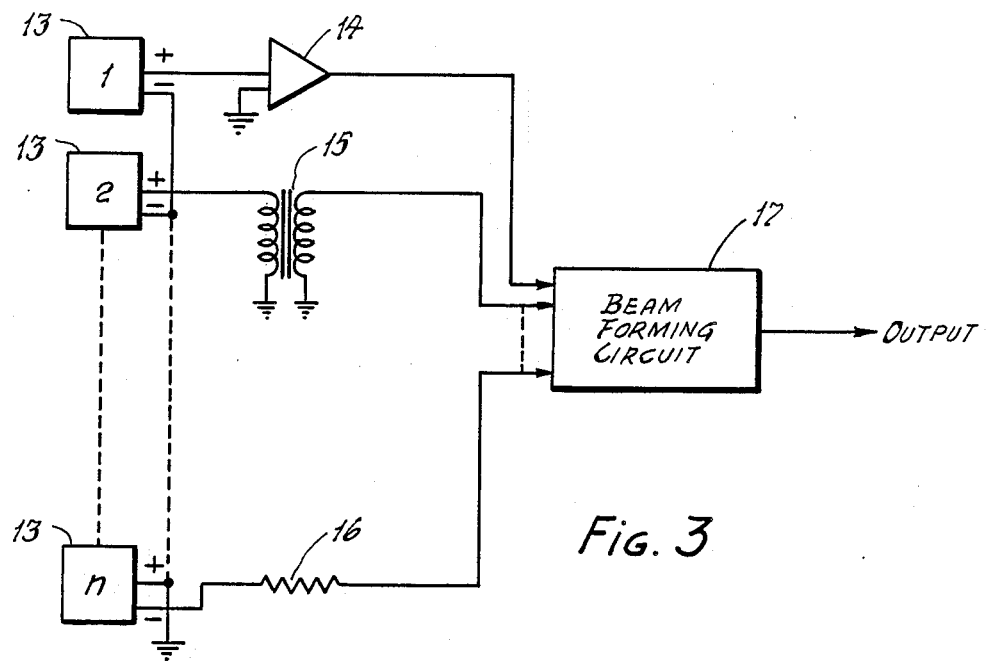
FIG. 3 is a diagrammatic sketch showing ways in which the gains and the polarities of the transducer elements may be varied.

Referring to FIG. 3, a diagram is shown whereby the use of a simple feedback amplifier 14, the use of a transformer 15 or the use of a resistor 16 determines the sensitivity and polarity of elements whose sensitivity and polarity cannot be designed into the element itself. These shading techniques are particularly useful with piezoelectric transducers. The output of a piezoelectric element may be amplified by the appropriate amount and phase-reversed by the above amplifier. Similar results can be achieved using a transformer or transformers with suitable windings. It can be readily seen that conventional planar arrays may be given a directional characteristic of the type herein described by providing each element of the array with a separate gain and phase control. In addition, variable gain controls may be utilized to adjust the overall gain of the array and thus the size of the array pattern. This phase and gain control may also be achieved in a beam-forming circuit 17. In this type of circuit, the outputs of the elements may be connected directly to a series of input windings on one side of a transformer (not shown). A single output winding of this transformer will provide an output which will contain the appropriate sum of the outputs of the elements. By providing input windings with different numbers of turns, the outputs of the elements can be shaded. Likewise, the beam-forming circuit may be a resistance ladder network (not shown), the shading being accomplished by the value of the resistances in the network. Finally, the beam-forming circuit may be any conventional mixing circuit which merely adds the already shaded outputs of the elements. This is shown in FIG. 3. FIG. 3 shows "n" already shaded elements 13 connected to a circuit 17. The shading is accomplished by three different means by way of illustration. The gain pattern of this array of elements will resemble an end-fire pattern at the output of the beam-forming circuit. It will be appreciated that the beam-forming circuit is connected to the shaded outputs of each element in such a way that at least one output from a transducer element is reversed in polarity with respect to the other element outputs. This is shown by the $n^{th}$ element in the above figure.

If the transducers are excited in an active mode by impressing a signal (not shown) on the "output" of the beam-forming circuit, the system shown in FIG. 3 may operate in reverse to produce an end-fire pattern from the transducer array. Depending on the type of mixing circuit used, the beam-forming circuit can be made to operate in both directions to allow the transducers an active or passive mode.

A 5×5 element array is shown in FIG. 5. Elements labeled "A" in the drawing have the same polarity as element "C". The inner elements "B" have a reversed polarity with respect to elements "A" and "C" to give this array and end-fire characteristic. In one experimental case, the shading of the respective elements shown in the figure is A=0.25; B=−1.167 and C=5.336. The sum of elements A, B and C produces a null result entering along an axis perpendicular to the plane of elements and passing through the central element. At all other angles, this sum will be nonzero. The number of elements the array may be increased to give increased sensitivity, increased notch or increased output if they are driven in an active mode.

Transducer elements in this type of array will produce an output which is useful in identifying the presence of countermeasures deployed by a target against an acoustic homing torpedo. Countermeasure signals detected by the subject array may then be used to cancel out the effect of the countermeasure on the entire target detection system.

In tactical ASW situations, a powerful countermeasure entering a side lobe of the main transducer array of an acoustic homing torpedo can mask a target signal even if the target signal is in the major lobe of this main array. It is commonly known that a reduction in side lobe sensitivity will make the system more difficult to countermeasure. Cancellation techniques well known in the radar art to reduce side lobe sensitivity have recently been adapted to underwater acoustics. In these systems, a transducer array having an omnidirectional pattern is used to obtain a countermeasure signal. Cancellation systems within the state of the art automatically adjust the phase and magnitude of the output of this omnidirectional array and subtract it from the output of the main array to cancel the countermeasure component in the main array. However, since an omnidirectional pattern is used to obtain the countermeasure signal, some target signal will also be present in the subtracted signal. In some cases, this can significantly affect the steering information going to the homing system. In addition, the target signal present in the omnidirectional signal may in some cases adversely effect the degree of cancellation that can be achieved or even increase the countermeasure signal. By substituting the PEF array for the omnidirectional array, there is less target signal in the subtracted signal. The PEF array thus alleviates the above-mentioned problem since directivity of the PEF array is such as to reduce sensitivity to the target as compared to the countermeasure.

Figure 6:
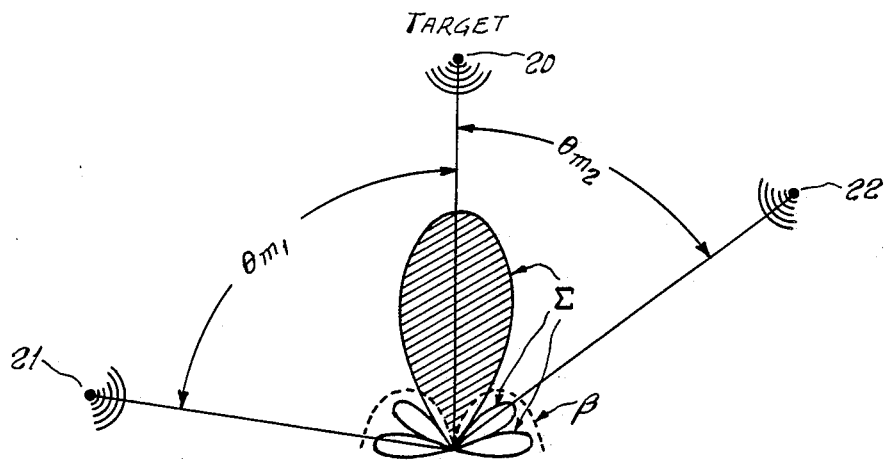
FIG. 6 is a polar plot of a planar end-fire directivity pattern superimposed over the directivity pattern of a directional array.

To illustrate this concept of cancellation, FIG. 6 shows the sensitivity pattern of the main directional array of an acoustic torpedo homing system. This pattern is denoted in the diagram by the letter Σ. This main array is used to detect a target 20 positioned along its major lobe. A PEF array of the type herein described is used in conjunction with this main array and has a pattern designated by the letter β. Two countermeasure signals are shown to be generated respectively at points 21 and 22. The countermeasure indicated at 21 arrives at the main array along one of its minor lobes. The signal from countermeasure 22 also arrives at the main array along another of its minor lobes. The angles at which these countermeasures are located are designated by the notations $\theta_{m1}$ and $\theta_{m2}$, so as to correspond to the notation of equations 1 and 2.

If the antenna pattern designated by β were to be reduced so that its gain were to equal the gain of the minor lobes in the Σ pattern, the result of subtracting the β pattern from the Σ pattern would be merely that portion of the Σ pattern which is shaded. Thus the combined array would be only sensitive to signals emanating from target 20.

Figure 7:
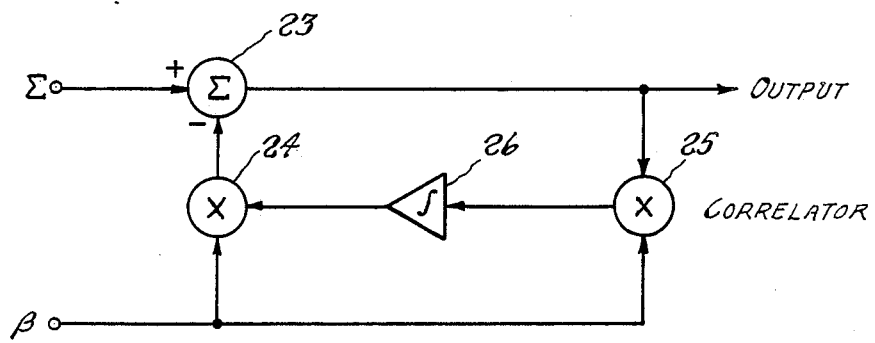
FIG. 7 is a schematic diagram of a system which subtracts the output of the subject transducer array from the output of the directional array of FIG. 6.

A schematic diagram of a system which reduces the gain of the β pattern to that of the gain of the minor lobes in the Σ pattern is shown in FIG. 7. Not only does this device provide for the reduction of the gain in the β pattern, but it also correlates the phase of the output of the β pattern array with the phase of the output of the minor lobes of the main array so that these outputs may be subtracted.

The output of the main array is fed to a summation device 23. This signal is summed with the negative of the adjusted β pattern signal. The adjustment of this β pattern is accomplished through a variable gain device 24 which is a simple multiplier. This multiplier is fed directly by the signal from the subject array and by a correlated and integrated signal as indicated in FIG. 7. Correlator 25 is also a simple multiplier being fed by both the β pattern signal and the output of 23. The output of the correlator is filtered by a conventional integrator 26.

Figure 8:
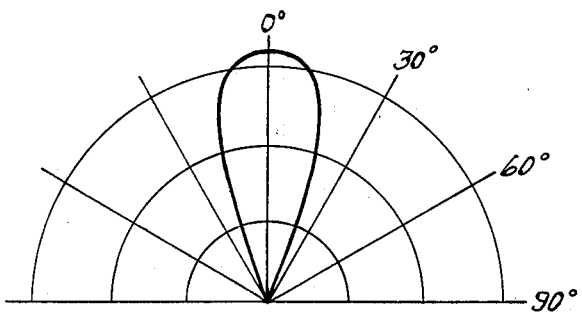
FIG. 8 is a polar plot of the directivity pattern produced by the system shown in FIG. 7 using transducer arrays having directivity characteristics shown in FIG. 6.

The effective output of the device shown in FIG. 7 is shown in FIG. 8. In this diagram only signals within 20° zero bearing are transmitted to the guidance system of a torpedo. Any countermeasure signals which might heretofore have entered in the minor lobes of the torpedo sensor are thus eliminated.

A special feature of the PEF directional array combination is that multiple countermeasures can be eliminated from the minor lobes of the main directional array. This is not generally true when an omnidirectional transducer array is used.

Obviously many modifications and variations of the present invention are possible in the light of the above teachings. In addition to ASW applications, the planar end-fire array described herein may be used in any application where such directional characteristics are desired and where it is convenient to use a planar array. Such applications include use in sonobuoys, surveillance systems and other underwater sound systems. In air, this type of array may be used in public address systems where an end-fire characteristic is desired.

What is claimed is:

1. An end-fire acoustic transducer array comprising:
   a planar matrix of acoustic transducer elements,
   each of said transducer elements having a predetermined gain, such that the total gain of selected elements of said matrix is equal to the total gain of the remaining elements in said matrix; and
   phase shifting means connected to said selected elements for reversing the phase of the output signals generated by these elements when said matrix is operated in an active mode and for reversing the phase of the input signals to these elements when said matrix is operated in a passive mode.

2. The transducer array as recited in claim 1 wherein said selected
   elements include the outer elements of said matrix, said outer elements having equal gains.

3. The transducer array as recited in claim 2 wherein said remaining elements include the central element of said matrix.

4. The transducer array as recited in claim 2 wherein said matrix contains five symmetrically arranged elements.

5. The transducer array as recited in claim 2 wherein said matrix is a 3×3 array of elements.

6. The transducer array as recited in claim 2 wherein said selected elements include the central element of said matrix.

7. The transducer array as recited in claim 6 wherein said matrix is a 5×5 array of elements, the remaining elements of said 5×5 array having equal gains.

8. The transducer array as recited in claim 7 wherein said transducer elements are spaced apart by $\lambda/2$, $\lambda$ being the operating wavelength of said array.

9. The transducer array as recited in claim 8 wherein said transducer elements are magnetostrictive.

10. Acoustic transducing apparatus having a sensitivity pattern characterized by minima in a predetermined direction and maxima in a plane at right angles thereto comprising:
    a planar matrix of identical acoustic transducer elements,
    the plane of said matrix corresponding to said first-mentioned plane; and
    a plurality of control means corresponding in number to the number of elements in said matrix,
    each of said control means coupled to a different element for effectively altering the gain and phase thereof such that the outputs of predetermined control means are phase-inverted with respect to the outputs of the remaining control means and such that the sum of the gains of said predetermined control means is equal to the sum of the gains of said remaining control means.

11. The apparatus recited in claim 10 wherein said predetermined control means are coupled to the outer elements of said array.

12. The apparatus as recited in claim 11 wherein said matrix is a 5×5 array of elements.

13. The apparatus as recited in claim 11 wherein said array contains five symmetrically arranged elements.

14. An end-fire transducer array comprising:
    a 5×5 rectilinear planar matrix of transducer elements,
    the inputs of the outer elements and the center element being phase-inverted with respect to the inputs of the remaining elements of said array;
    the gains of said remaining elements being equal;
    the gains of said outer elements being equal; and
    the sum of the gains of said outer and center elements being equal to the sum of the gains of said remaining elements.

15. In combination:
    a main acoustic transducer array having a directional sensitivity pattern including a main lobe and side lobes;
    a planar end-fire transducer comprising,
        a rectilinear array of acoustic transducer elements,
        predetermined elements of said array having outputs which are phase-inverted with respect to the outputs of the remaining elements of said array,
        each of said transducer elements having a predetermined gain such that the total gain of said predetermined elements is equal to the total gain of said remaining elements;
    means for altering the amplitude and phase of the output of said planar end-fire transducer so as to correspond to the amplitude and phase of that portion of the output of said main array generated by a signal entering any side lobe thereof; and
    means for subtracting said altered output from the output of said main array.

16. An end-fire transducer array comprising:
    a planar matrix of acoustic transducer elements,
    said matrix having a central element and one or more squares of elements concentrically surrounding said central element such that those elements in the square next surrounding said center element have outputs which are phase-reversed with
    respect to the output of said central element,
        each of the elements in said matrix having predetermined gains such that the total gain of the elements having phase-reversed outputs equals the total gain of the remaining elements of said matrix.

17. The transducer array as recited in claim 16 wherein when said matrix includes more than one square of elements, the elements of the square surrounding said next surrounding square having outputs which are in-phase with the output of said central element.

* * * * *